(12) United States Patent
Lim et al.

(10) Patent No.: US 9,753,442 B2
(45) Date of Patent: *Sep. 5, 2017

(54) TEMPERATURE MONITORING SYSTEMS AND METHODS

(71) Applicant: Seagate Technology LLC, Cupertino, CA (US)

(72) Inventors: Kang Hai Lim, Singapore (SG); Lucas Kong Yaw Lee, Singapore (SG); Scott Vincent Vitale, Oklahoma City, OK (US); Choon Wei Ng, Singapore (SG); Jun Gu, Singapore (SG)

(73) Assignee: Seagate Technology LLC, Cupertino, CA (US)

(*) Notice: Subject to any disclaimer, the term of this patent is extended or adjusted under 35 U.S.C. 154(b) by 412 days.

This patent is subject to a terminal disclaimer.

(21) Appl. No.: 13/973,525

(22) Filed: Aug. 22, 2013

(65) Prior Publication Data

US 2014/0005854 A1    Jan. 2, 2014

Related U.S. Application Data

(63) Continuation of application No. 12/837,132, filed on Jul. 15, 2010, now Pat. No. 8,548,639.

(51) Int. Cl.
*G05B 15/02* (2006.01)
*G06F 1/20* (2006.01)
*G11B 19/04* (2006.01)

(52) U.S. Cl.
CPC ............ *G05B 15/02* (2013.01); *G06F 1/206* (2013.01); *G11B 19/046* (2013.01); *Y02B 60/1275* (2013.01)

(58) Field of Classification Search
CPC ......... G05B 15/02; G11B 19/046; G06F 1/20; G06F 1/203; G06F 1/206; Y02B 60/1275
USPC ......................................................... 700/300
See application file for complete search history.

(56) References Cited

U.S. PATENT DOCUMENTS

| | | | | |
|---|---|---|---|---|
| 5,557,551 | A * | 9/1996 | Craft | G06F 1/206 702/130 |
| 5,623,647 | A * | 4/1997 | Maitra | G06F 1/206 713/501 |
| 6,535,798 | B1 * | 3/2003 | Bhatia et al. | 700/293 |
| 6,604,023 | B1 * | 8/2003 | Brown et al. | 700/276 |
| 6,735,546 | B2 * | 5/2004 | Scheuerlein | G11C 7/04 365/201 |
| 7,612,790 | B2 * | 11/2009 | Taniguchi | B41J 2/335 347/200 |

(Continued)

OTHER PUBLICATIONS

Office Action from the U.S. Patent and Trademark Office dated Apr. 30, 2012 for U.S. Appl. No. 12/837,132.

(Continued)

*Primary Examiner* — Charles Kasenge
(74) *Attorney, Agent, or Firm* — Westman, Champlin & Koehler, P.A.

(57) ABSTRACT

This disclosure is related to systems and methods for temperature monitoring of electronics, such as a controller or processor within a data storage device. In one example, a controller may be configured to determine an operation to perform and determine a temperature of electronics associated with executing the operation. The controller may then delay execution of the operation when the temperature is greater than a threshold.

20 Claims, 5 Drawing Sheets

(56) References Cited

U.S. PATENT DOCUMENTS

| | | | |
|---|---|---|---|
| 8,819,686 B2* | 8/2014 | Memik | G06F 1/206 |
| | | | 718/102 |
| 2003/0060934 A1* | 3/2003 | Walsh | 700/299 |
| 2003/0202413 A1* | 10/2003 | Komura et al. | 365/222 |
| 2005/0180301 A1* | 8/2005 | Taniguchi | B41J 2/335 |
| | | | 369/127 |
| 2005/0192727 A1* | 9/2005 | Shostak et al. | 701/37 |
| 2005/0216775 A1* | 9/2005 | Inoue | G06F 1/206 |
| | | | 713/300 |
| 2006/0025897 A1* | 2/2006 | Shostak et al. | 701/1 |
| 2007/0146467 A1* | 6/2007 | Taniguchi | B41J 2/335 |
| | | | 347/194 |
| 2007/0205881 A1* | 9/2007 | Breed | 340/447 |
| 2007/0206314 A1* | 9/2007 | DeRosa et al. | 360/75 |
| 2007/0277006 A1* | 11/2007 | Chu et al. | 711/154 |
| 2009/0043441 A1* | 2/2009 | Breed | 701/29 |
| 2010/0269521 A1* | 10/2010 | Moore | 62/91 |
| 2011/0023039 A1* | 1/2011 | Memik | G06F 1/206 |
| | | | 718/102 |

OTHER PUBLICATIONS

Final Office Action from the U.S. Patent and Trademark Office dated Aug. 24, 2012 for U.S. Appl. No. 12/837,132.
Notice of Allowance from the U.S. Patent and Trademark Office dated May 22, 2013 for U.S. Appl. No. 12/837,132.
Corrected Notice of Allowability from the U.S. Patent and Trademark Office dated Jul. 17, 2013 for U.S. Appl. No. 12/837,132.

* cited by examiner

TEMPERATURE MONITORING SYSTEMS AND METHODS

CROSS REFERENCE TO RELATED APPLICATION

The present application is a continuation of and claims priority of U.S. patent application Ser. No.12/837,132, filed Jul. 15, 2010, the content of which is hereby incorporated by reference in its entirety.

BACKGROUND

Variations in temperature can affect the function of electronics in a device, especially variations of temperature in integrated circuits, such as microprocessors and controllers. For example, in a data storage device, a data storage controller can be critical to to the reliability of data and the functioning of the data storage controller may be affected by temperature; thus, temperature variations in a data storage controller may affect the reliability of data. Thus, system and methods for monitoring the temperature of electronics are needed.

SUMMARY

In one embodiment, a data storage device may include an interface to receive a command from a host computer system, a data storage medium, and a controller coupled to the interface and the data storage medium. The controller may be configured to determine an operation to perform based on an instruction received via the interface from the host computer system and determine a temperature of electronics within the data storage device associated with executing the operation. The controller may also be configured to delay execution of the operation when the temperature is greater than a threshold.

In another embodiment, a controller may be configured to determine an operation to perform and determine a temperature of electronics associated with executing the operation. The controller may also delay execution of the operation when the temperature is greater than a threshold.

In yet another embodiment, a method may comprise determining, via a controller, a data storage operation to perform based on an instruction received from an interface and determining, also via the controller, a temperature of electronics within a data storage device associated with executing the data storage operation. The method may further comprise delaying, via the controller, execution of the data storage operation when the temperature is greater than a threshold.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
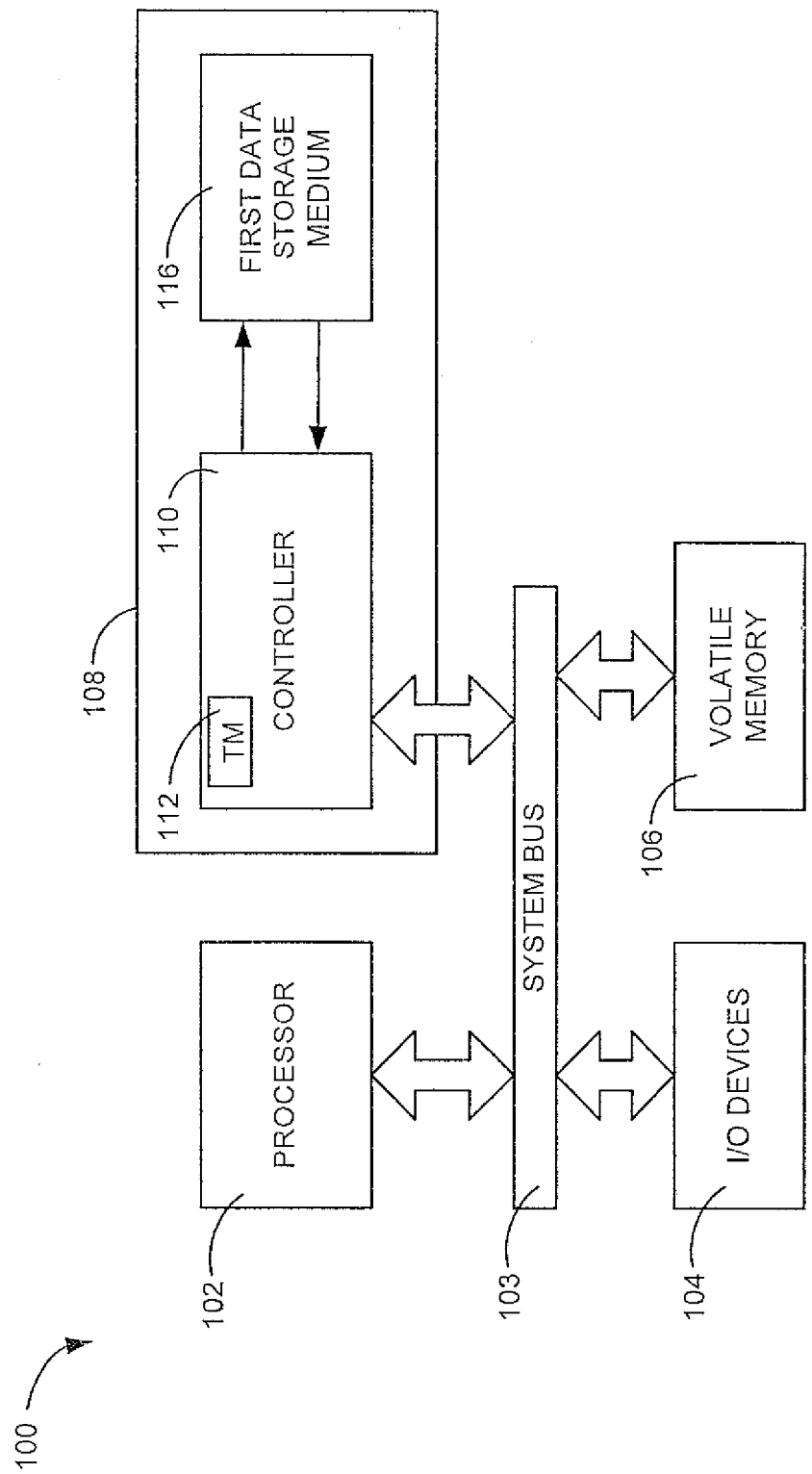
FIG. 1 is a diagram of an embodiment of a temperature monitoring system for a data storage device.

Referring to FIG. 1, a particular embodiment of a system having a temperature monitor within a data storage device is shown and generally designated 100. The system 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory, such as dynamic random access memory (DRAM). The system bus 103 may also be coupled to a data storage device 108. In a particular embodiment, the data storage device 108 comprises a rotatable data storage medium, such as a magnetic disk, optical disk, or a magneto-optical disk. In another embodiment, the data storage device 108 may comprise a hybrid data storage device having both non-volatile solid state memory and a disc memory. In yet another particular embodiment, the data storage device 108 may comprise a non-volatile solid state memory storage device, such as a Flash memory device.

The data storage device 108 may be a removable data storage device that includes a connector (not shown) to allow the data storage device 108 to be plugged into and unplugged from the system 100, for example via a cable. The data storage device 108 may include a controller 110, which may be coupled to the processor 102 via an interface connection (not shown) to the system bus 103. The controller 110 may include a temperature monitoring system 112 adapted to implement a temperature monitoring within the data storage device 108. The temperature monitoring system 112 may be a circuit, to firmware module, or a combination thereof. The temperature monitoring system 112 may also include a temperature measuring device, such as a temperature sensing diode, that can be placed near particular components with the data storage device 108. The data storage device 108 may also contain a data storage medium 116. In a particular embodiment, the first data storage medium 116 may be a rotatable magnetic disc data storage medium. The systems and methods disclosed herein may be applied to any type of data storage device regardless of the type of data storage medium implemented. In another particular embodiment, a temperature sensing diode may be located adjacent a processor within the controller 110. The temperature sensing diode may be internal or external to the controller 110.

The data storage device 108 may communicate with the processor 102 via an interface (not shown) adapted to receive commands and data from the processor 102. Further, the data storage device 108 may be configured to implement the temperature monitoring system 112 via hardware, software, or a combination thereof. Further, the temperature monitoring system 112 may be implemented independent of the processor 102 or any other hardware or function of the system 100. In a particular embodiment, the temperature monitoring system may be implemented within the controller 110, which also may be a data storage controller.

During operation, the controller 110 may ensure that integrated circuits, such as the controller 110 itself, do not overheat or remain in a hazardous temperature range. This may be done regardless of way of usage. Generally, this may be accomplished by executing a time consume thread (i.e.

software process) during firmware activities of the controller 110 while still providing normal operation of the controller 110.

In a data storage device, such as a disc drive or solid state data storage device, there can be exhaustive activities of read operation that proceed for a long duration without stopping. These exhaustive activities, such as a full thrust continuous sequential read operation, can require a processor to remain continuously active to process data. Active logic gates that may be used in performing the exhaustive activities can become very hot and exceed specified operating temperatures, even while an ambient temperature of the whole device (the controller or the data storage device) remains within an acceptable specified temperature range. For example, in a data storage device, overheating of a processor could cause the data storage device to fail to meet its warranty period of product operability, performance requirements, or even safety requirements.

In one embodiment, the controller 110 may determine an operation to perform based on an instruction received via the interface from the host system 100. The controller 110 may then determine a temperature of electronics within the data storage device associated with executing the operation and delay execution of the operation when the temperature is greater than a threshold. The electronics may be any integrated circuit or any other temperature sensitive device within the data storage device 108, such as the controller 110 or the data storage medium 116. The functions and methods described herein may be, in part or in whole, performed by a circuit (not shown) that is not within the controller 110.

In a particular embodiment, the controller 110 (or other circuit (not shown) within the data storage device 108) may determine a location on the data storage medium 116 to store data associated with an instruction. The controller 110 may then perform a first operation, such as a read or write, on the location, determine if there is a second location associated with the instruction, and perform a temperature operation. The temperature operation may include determining a temperature of electronics associated with performing a second operation on the second location. Once the temperature is determined, the controller 110 may compare the temperature to the threshold, delay the second operation from being executed when the temperature is greater than the threshold, and perform the second operation when the delay is completed. If the temperature is not greater than the threshold, then the controller 110 may execute the second operation without a delay. In one example, the first location may include a first track on a rotatable data storage medium and the second location may include a second track on the rotatable data storage medium.

The threshold may be adjustable and can be lowered as the in-service time of the data storage device increases. Further, the threshold may be determined and set based on a sampling of temperature measurements during a period of inactivity of the data storage device.

The delay may be implemented within the controller 110, such as a delay introduced into execution of instructions within the controller 110. The delay may also be based on a predetermined number of rotations of the data storage medium, where the predetermined number of rotations is at least one rotation. The delay may be implemented via software within the controller by adding a redundant cycle into firmware of the controller. The delay may put the microprocessor into a rest mode which may halt a heating element in the electronics (e.g. digitial logic gates) and allow a cool down of physical elements within the data storage device 108. Mechanical and electrical components or actions may be cooled down during the delay, such as by reducing power to a spinning data storage medium or turning off a heat assisted magnetic recording heating element.

The temperature may be sensed via a temperature sensor coupled to the controller 110 or within the controller 110. The temperature sensor may also be coupled to a circuit external to the controller 110, where the circuit is configured to determine if the temperature is greater than a threshold and provide a result to the controller 110. The temperature sensor may be proximately located near the device. For example, the temperature sensor may be located, internally or externally, proximate to a specific circuit within the controller 110. In a particular embodiment, the temperature sensor may be located near a microprocessor circuit of the controller 110. The data storage device 108 may reduce power to the microprocessor within the controller 110 during the delay. The temperature operation may operate to measure the temperature periodically or on each operation (or data burst) when continuous or intense activity is detected. To compensate for temperature, the normal time delay between operations (or data bursts) may be increased by introducing a delay or idle period.

In one embodiment, the temperature operation may include a temperature measurement timer that operates within a core thread of a processor that has lower priority over interface and read/write threads. When both interface and read/write threads sleep (i.e. inactive), the core thread can be active and run the temperature measurement (when a specified time has elapsed) and update a current controller temperature. A resource mediator may be involved to determine other functions to perform. This can ensure high to priority and performance functions are not affected.

In another embodiment, both the temperature measurement and delay functions may be implemented within a read/write thread before a controller goes into a sleep/idle mode. This can ensure a temperature reading of each continuous read/write operation (or burst) is measured and the compensation/temperature regulation (delay) is performed if necessary.

In a particular embodiment, the data storage device 108 may be a magnetic disc data storage device that includes a head element coupled to the controller 110 to allow reading and writing of data to the data storage medium 116. Further, the controller 110 may reduce power to the head element during the delay. The data storage device 108 may also include a heater proximate to the head element, where the heater is configured to implement heat assisted magnetic recording, and power to the heater may be reduced during the delay.

Figure 2:
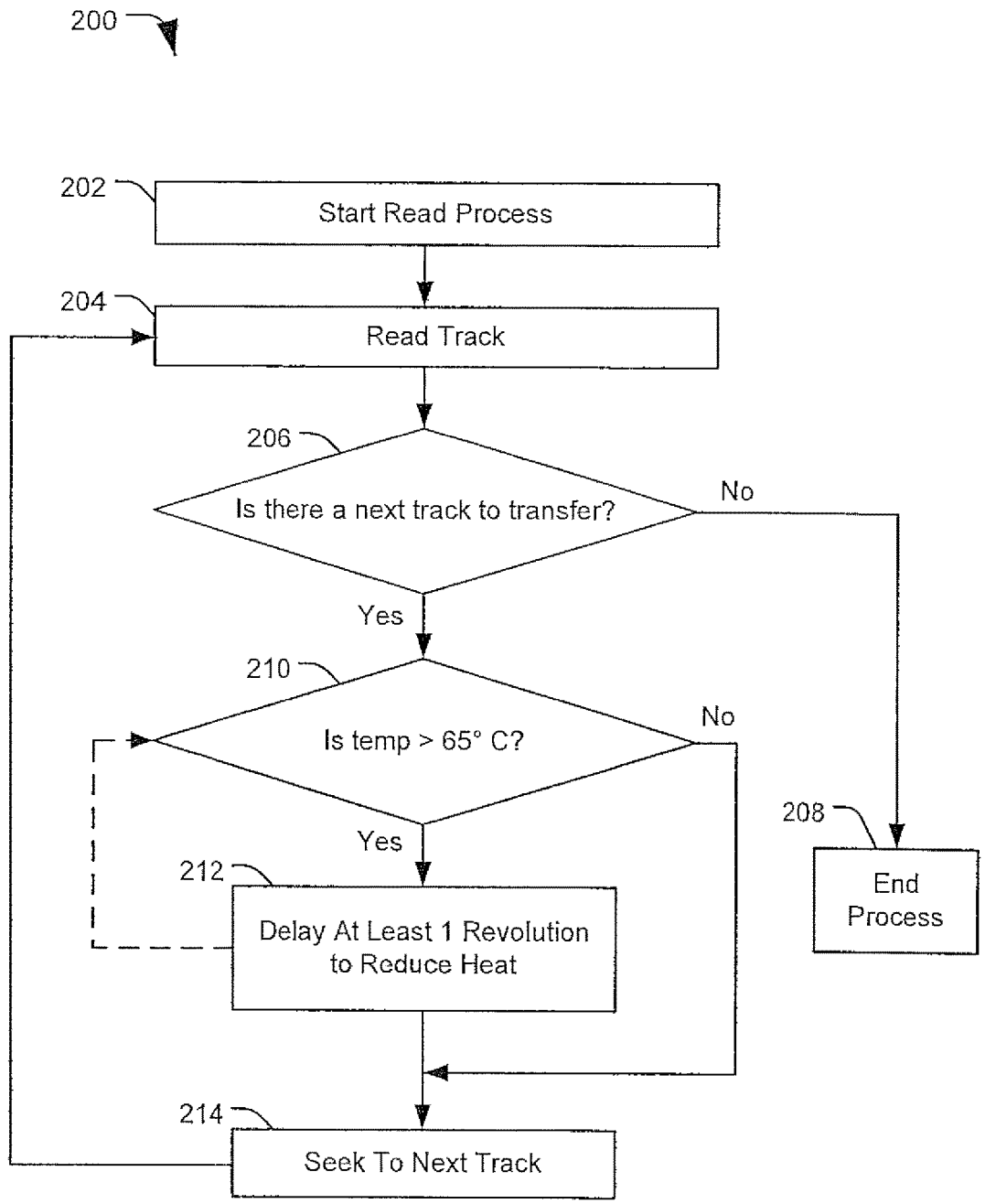
FIG. 2 is a flowchart of an embodiment of a temperature monitoring method for a device.

FIG. 2 shows a flowchart of an embodiment of a temperature monitoring method 200 for a device. The method 200 may be implemented in an electronic device or an electro-mechanical device, such as the data storage device 108 shown in FIG. 1. In a particular embodiment, the method 200 may be implemented by the temperature monitoring system 112, which may be a circuit, firmware module, or a combination thereof.

The method 200 may include a first process or operation being started, at 202, such as read process/operation. Then, the first process may be executed, at 204, such as a read track operation. Once the first operation is completed, the method 200 may determine if there is another process or operation to execute, at 206, such as a next track transfer operation. The next operation to execute may be another part of the first operation or may be a separate second operation. If there is not another operation to execute, the method 200 may end, at 208.

When there is another process or operation to execute, the method 200 may include comparing a measured temperature to a threshold, at 210. The temperature threshold may to be determined based on acceptable operating ranges of the electronic component(s) being monitored. In one example, the temperature threshold may be 65 degrees Celsius. In another example, the temperature threshold may be determined based on a useful life of a component along with an in-service time period of the component and may be adjusted, either lower or higher, as the in-service time period increases. In yet another embodiment, the threshold may be determined or set via an input received externally from the device.

If the measured temperature is lower than the threshold, the method 200 may execute the next process or operation, at 214, such as seek to a next track for reading data, at 204. When the measured temperature is greater than the temperature threshold, the method 200 may add a delay, at 212, before executing the next process or operation, at 214. The delay may be accomplished by adding a redundant cycle operation ( )to controller firmware that puts halts a processor operation for the redundant cycle time period. The redundant cycle operation may provide enough time to allow the mechanical and/or electrical components of the device to cool and for the measured temperature to be less than the threshold.

In another embodiment, the method 200 may include determining if the measured temperature is less than the threshold, at 210, after executing the delay, at 212. This may allow the device not to execute the second process or operation until the measured temperature is less than the threshold.

Figure 3:
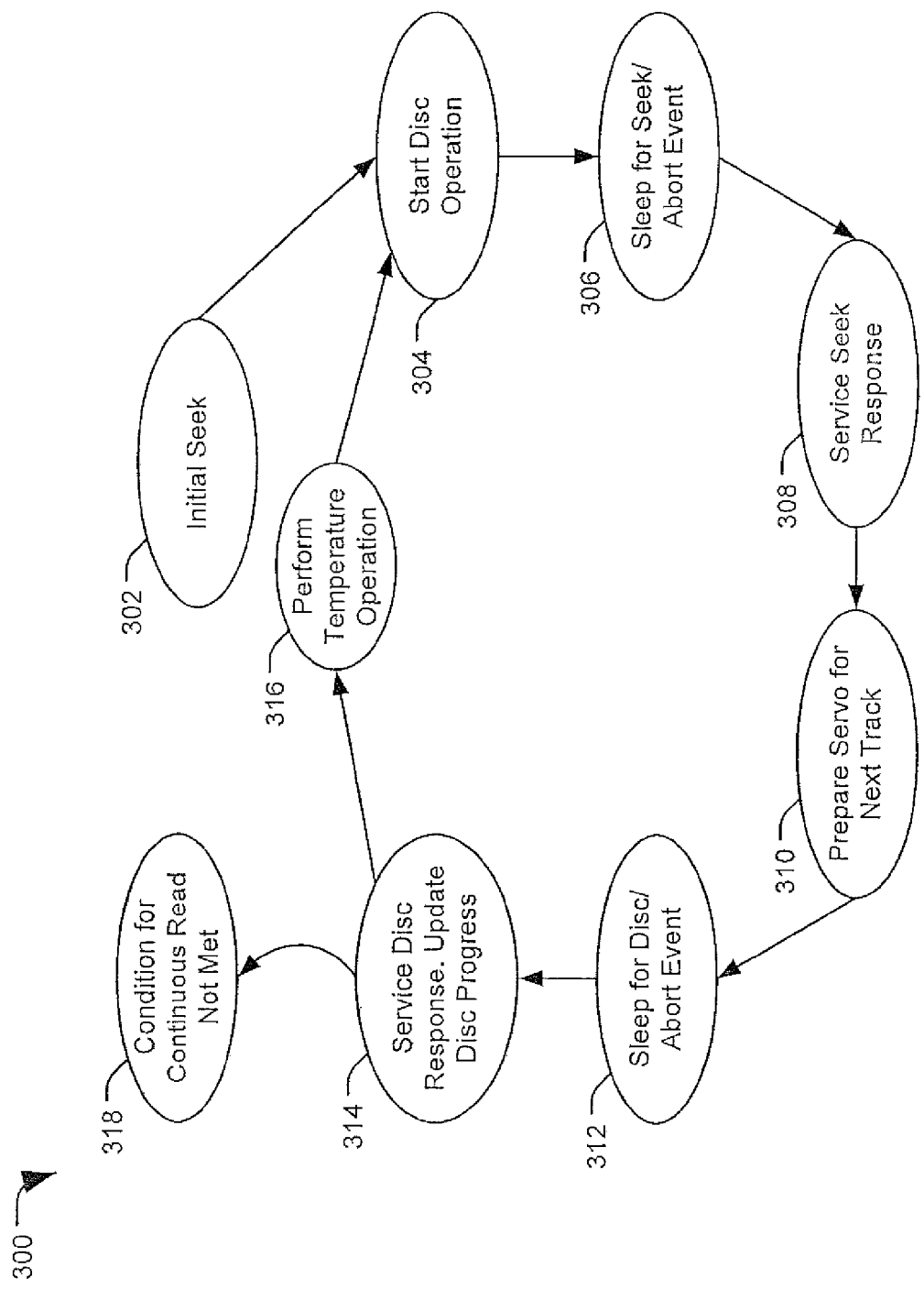
FIG. 3 is a flowchart of another embodiment of a temperature monitoring method for a device.

FIG. 3 shows a flowchart of an embodiment of a temperature monitoring method 300 for a device. The method 300 may be implemented in a data storage device, such as the data storage device 108 shown in FIG. 1. In a particular embodiment, the method 300 may be implemented by the temperature monitoring system 112, which may be a circuit, firmware module, or a combination thereof.

The method 300 may include initiating a seek due to a request to transfer data from a data track, at 302. The method 300 may then start the disc operation mode, where the controller hardware is prepared to perform a disc transfer, at 304.

The method 300 may then proceed to a sleep for seek/abort event mode where the read/write thread enters a sleep mode to wait for a servo interrupt, at 306. Once a servo interrupt is received, the method 300 may enter a service seek response mode, where the read/write thread receives a servo interrupt and service error, if any, at 308. Next, the method 300 enters a prepare servo for next track mode, where the read/write thread sends the next track to seek to the servo subsystem when a later disc transfer is complete, at 310.

Then, the method 300 may include a sleep for disc/abort event mode, where the read/write thread enters a sleep mode to wait for a servo interrupt, at 312. When the read/write thread receives a servo interrupt and service error, if any, a service disc response mode and update disc progress mode is entered, at 314, where a determination is made if there is a next track to transfer.

If there is a next track to transfer, the method 300 includes performing a temperature operation, at 316. If there is not a next track to transfer, the method 300 may end, at 318, because the conditions for a continuous read are not met. When there is not continuous read operations being performed there is a lower chance of overheating of the electronic circuits that perform the reads.

The temperature operation performed, at 316, may include measuring a temperature, comparing the temperature to a threshold temperature, and delaying the next track from being transferred if the measured temperature is greater than the threshold temperature. The temperature measurement operation(s) may include updates to a temperature threshold based on electronics that are being monitored. Such updates may occur during times when the data storage device detects an idle servo condition or sufficient background processing is available. The temperature measurement operations may also include comparing a measured temperature to a threshold to determine whether a delay is needed to allow cooling of a device, such as described with respect to the systems and methods of FIG. 1 and FIG. 2.

Figure 4:
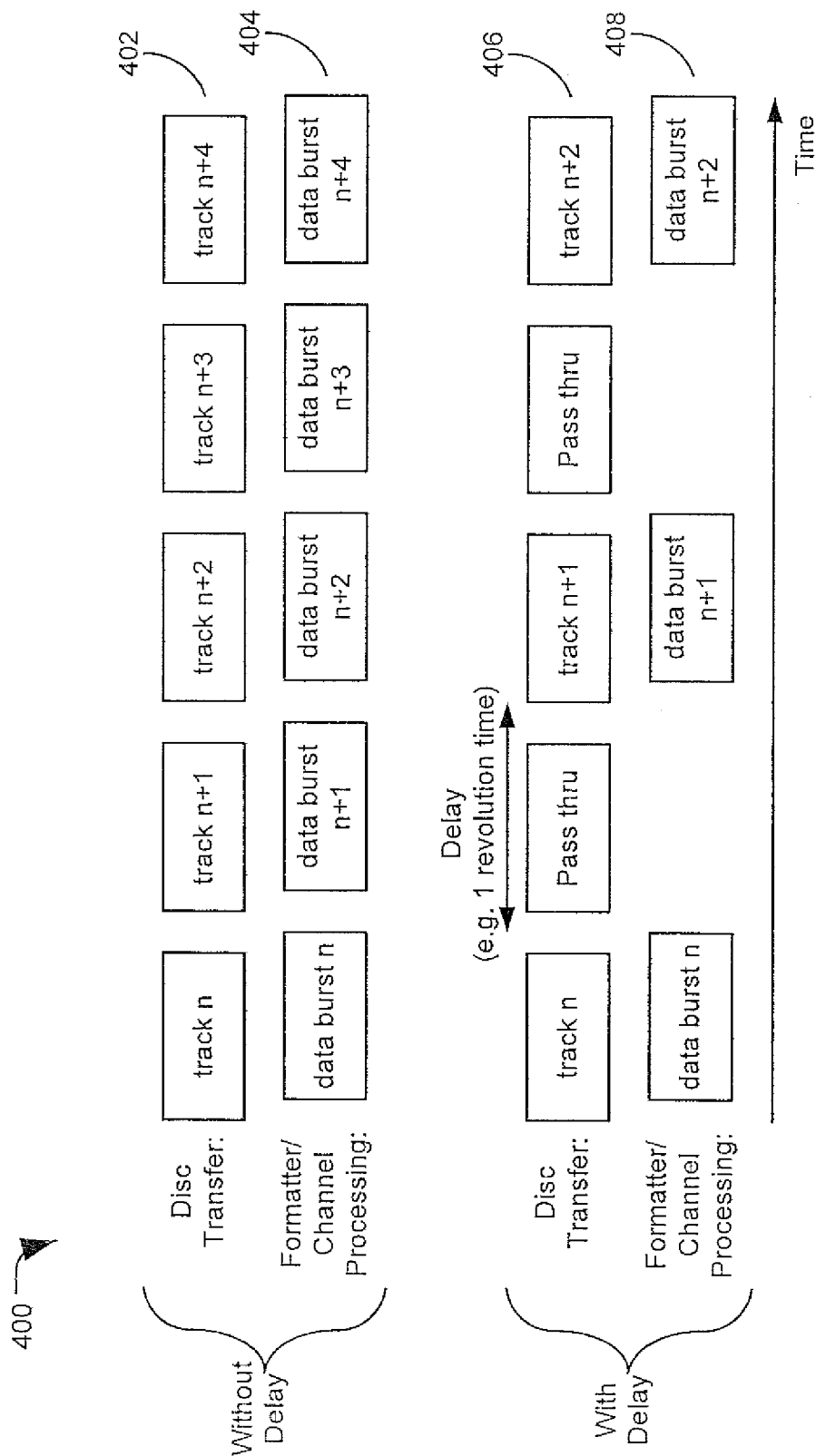
FIG. 4 is a diagram of an embodiment of a temperature monitoring system for a data storage device.

FIG. 4 shows a diagram of an embodiment of a temperature monitoring system 400 for a data storage device, such as the data storage device 108 shown in FIG. 1. The system 400 may include a controller, a data storage medium such as a disc, and electronics to allow data to be stored on the data storage medium (none of which are shown in FIG. 4). to The controller may manage reading and writing of data from and to the data storage medium and may apply a delay element to the writing process if electronics within the data storage device are overheating, such as past an acceptable threshold.

During operation, the controller may implement writing or reading operations for determined locations, at 402, without a delay element by writing or reading data bursts on each successive period, at 404. In one embodiment, a period may be a single revolution of a disc data storage medium where a single track is written during a revolution and the determined location is the next track for continuous writing (or almost continuous writing). In another embodiment, the writing period may be a write time of a memory, such as solid state memory; for example, Flash memory.

The controller may also selectively implement writing or reading operations for determined locations, at 406, with a delay element by writing or reading data bursts on less than all of the periods, at 408. For example, to allow the system to cool, the system may add a delay or idle period in-between reading or writing data bursts. In one embodiment, the delay element is equal to one rotation of a disc. The delay or idle period may be pre-calculated. The throughput of data in the system may also need to be reduced to account for the delay or idle period. Further, the delay or idle period may be any amount of time, whether it is bigger or smaller than one nominal period of writing or reading data.

Figure 5:
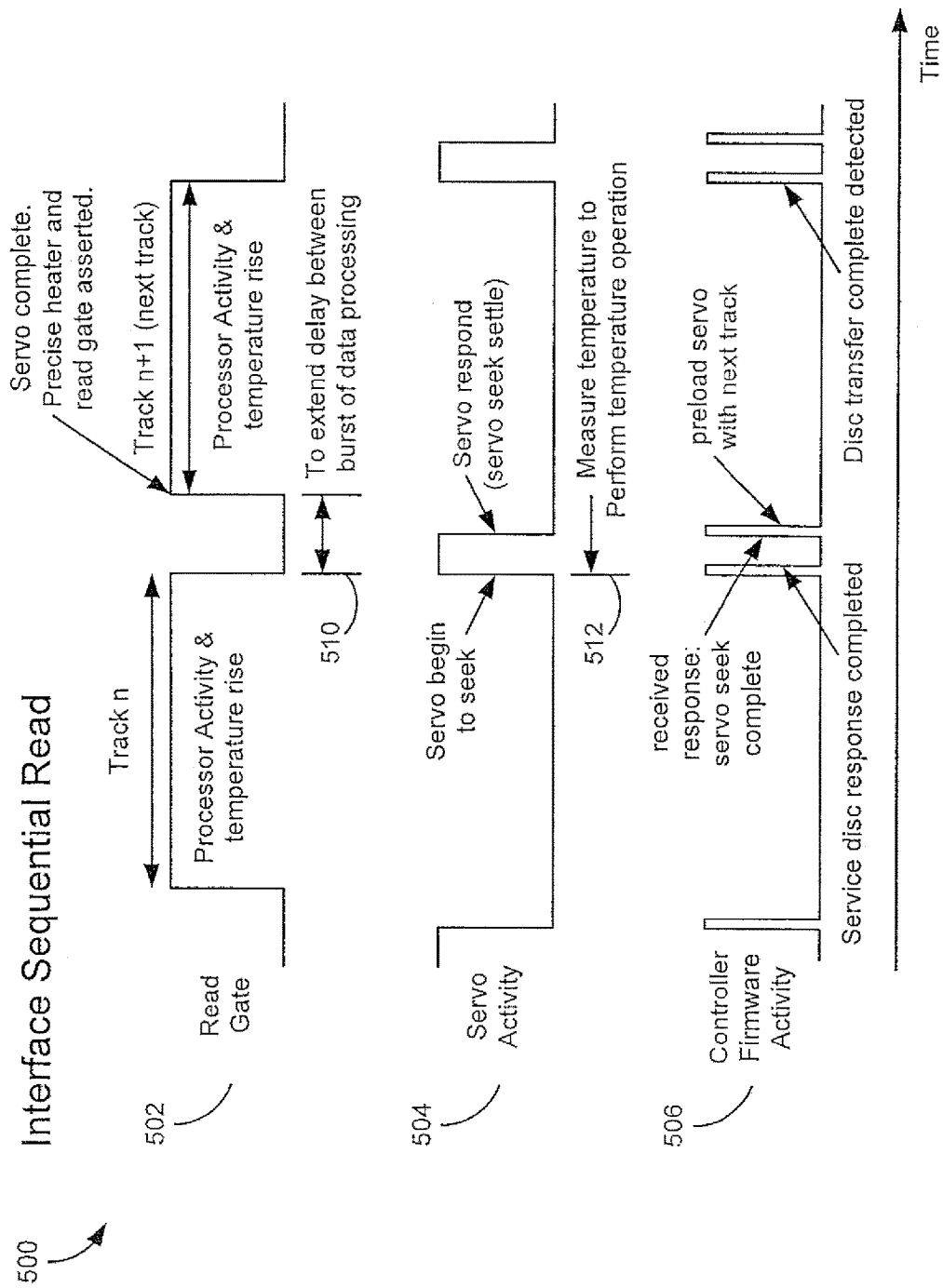
FIG. 5 is a timing diagram of a temperature monitoring system for a data storage device.

FIG. 5 shows a diagram of a temperature monitoring system 500 for a data storage device. The temperature monitoring system 500 may be implemented by the systems and methods as shown in FIGS. 1-4 and the embodiments discussed herein.

The diagram shows a read gate signal 502, a servo activity signal 504, and controller activity signal 506 that show relative timing and operations of a data storage device. A delay/idle period 510 is shown between the processing activity of reading or writing a next data location (e.g. a track). The delay/idle period may be increased or decreased in accordance with the embodiments disclosed herein to account for temperature overheating of components within the data storage device. For example, the delay may be increased to account for a full revolution of a disc data storage medium. In addition, a temperature operation 512, as described herein, may be performed at the beginning of, or during, the delay/idle period.

It is to be understood that even though numerous characteristics and advantages of various embodiments have been set forth in the foregoing description, together with details of the structure and function of the various embodiments, this disclosure is illustrative only, and changes may be made in detail, especially in matters of structure and arrangement of parts. For example, the embodiments described herein can be implemented for any type of electronic device or data storage device that may have temperature as a concern. Further, the methods describe herein may be implemented by a computer processor, controller, hardware circuits, or any combination thereof. Also, the particular elements may vary depending on the particular application for the electronic device while maintaining substantially the same functionality without departing from the scope and spirit of the present disclosure. In addition, although an embodiment described herein is directed to a rotatable data storage system, it will be appreciated by those skilled in the art that the teachings of the present application can be applied to any type of data storage device or electronic device that may benefit from the ideas, structure, or functionality disclosed herein, such as a solid state data storage device or any other device with a processor.

What is claimed is:

1. A data storage device comprising:
   a controller coupled to an interface and to a rotatable data storage medium, the controller configured to:
   determine an operation to perform based on an instruction received via the interface from a host computer system;
   if the operation is a data access operation, determine whether the operation meets a condition for a continuous data access operation, wherein the condition for the continuous data access operation is that the data access operation spans multiple data tracks on the rotatable data storage medium;
   determine a temperature of electronics within the data storage device associated with executing the operation; and
   delay execution of the operation when both the temperature is greater than a threshold and when the operation meets the condition for the continuous data access operation.

2. The data storage device of claim 1 further comprising a temperature sensor proximate to the electronics and configured to determine the temperature.

3. The data storage device of claim 2 wherein the delay is implemented via software within the controller and wherein the delay comprises a redundant cycle introduced into firmware of the controller.

4. The data storage device of claim 1 wherein the threshold is adjustable and the threshold is lowered in response to an in-service time increase of the data storage device.

5. The data storage device of claim 1 wherein the threshold is set based on a sampling of temperature measurements during a period of inactivity of the data storage device.

6. The data storage device of claim 1 wherein the electronics comprise a microprocessor, and wherein the controller is configured to reduce power to the microprocessor during the delay.

7. The data storage device of claim 6 further comprising the controller further configured to:
   determine a location of the rotatable data storage medium for data associated with the instruction;
   perform a first portion of the operation on the location;
   determine a temperature of electronics associated with performing a second portion of the operation on another location of the rotatable data storage medium that is associated with the instruction;
   compare the temperature of the electronics associated with performing the second portion of the operation to the threshold;
   delay the second portion of the operation associated with the another location when the temperature of the electronics associated with performing the second portion of the operation is greater than the threshold; and
   perform the second portion of the operation on the another location when the delay is completed.

8. The data storage device of claim 7 wherein the operation comprises reading or writing data.

9. The data storage device of claim 7 wherein the rotatable data storage medium comprises a magnetic disc data storage medium and wherein the location comprises a track on the rotatable data storage medium and the another location comprises a second track on the rotatable data storage medium.

10. The data storage device of claim 9 wherein the delay comprises a predetermined number of rotations of the rotatable data storage medium, wherein the predetermined number of rotations comprises at least one rotation.

11. The data storage device of claim 10 further comprising a head element coupled to the controller to allow reading and writing of data to the rotatable data storage medium and reducing power to the head element during the delay.

12. The data storage device of claim 11 further comprising a heater proximate to the head element and reducing power to the heater during the delay.

13. A method comprising:
    determining, via a controller, a data storage operation to perform based on an instruction received from an interface;
    if the operation is a data access operation, determining, via the controller, whether the operation meets a condition for a continuous data access operation; and
    determining, via the controller, a temperature of electronics within a data storage device associated with executing the data storage operation; and
    delaying, via the controller, execution of the data storage operation when both the temperature is greater than a threshold and when the operation meets the condition for the continuous data access operation,
    wherein the condition for determining that the operation is the continuous data access operation is that the data access operation spans multiple tracks on a rotatable data storage medium of the data storage device.

14. The method of claim 13 wherein the delaying comprises a delay of at least one rotation of the rotatable data storage medium.

15. A data storage device comprising:
    a controller coupled to an interface and to a data storage medium, the controller configured to:
    determine an operation to perform based on an instruction received via the interface from a host computer system;
    if the operation is a data access operation, determine whether the operation meets a condition for a continuous data access operation;
    determine a temperature of electronics within the data storage device associated with executing the operation; and delay execution of the operation when both the temperature is greater than a threshold and when the operation meets the condition for the continuous data access operation, wherein:

the threshold is adjustable and the threshold is lowered in response to an in-service time increase of the data storage device; or the threshold is set based on a sampling of temperature measurements during a period of inactivity of the data storage device.

16. The data storage device of claim 15 and wherein the operation comprises reading or writing data.

17. The data storage device of claim 15 and wherein the data storage medium comprises a rotatable data storage medium.

18. The data storage device of claim 17 and wherein the delay comprises a predetermined number of rotations of the rotatable data storage medium.

19. The data storage device of claim 17 and further comprising a head element coupled to the controller to allow reading and writing of data to the rotatable data storage medium and reducing power to the head element during the delay.

20. The data storage device of claim 19 and further comprising a heater proximate to the head element and reducing power to the heater during the delay.

* * * * *